United States Patent
Hilberg

[15] 3,693,159

[45] Sept. 19, 1972

[54] DATA STORAGE SYSTEM WITH MEANS FOR ELIMINATING DEFECTIVE STORAGE LOCATIONS

[72] Inventor: Wolfgang Hilberg, Neu-Ulm, Germany

[73] Assignee: Licentia Patent-Verwaltungs-G.m.b.H., Frankfurt, Germany

[22] Filed: June 22, 1970

[21] Appl. No.: 48,300

[30] Foreign Application Priority Data

| | | |
|---|---|---|
| June 21, 1969 | Germany | P 19 31 524.3 |
| Feb. 17, 1970 | Germany | P 20 07 050.2 |
| Feb. 20, 1970 | Germany | P 20 07 787.6 |
| Feb. 25, 1970 | Germany | P 20 08 663.9 |

[52] U.S. Cl. ....... 340/172.5

[51] Int. Cl. ....... G06f 11/00, G11c 19/00

[58] Field of Search ....... 340/172.5, 174 ED; 235/153

[56] References Cited

UNITED STATES PATENTS

| | | | |
|---|---|---|---|
| 3,541,525 | 11/1970 | Gange | 340/172.5 |
| 3,422,402 | 1/1969 | Sakalay | 340/172.5 |
| 3,222,653 | 12/1965 | Rice | 340/172.5 |
| 3,234,521 | 2/1966 | Weisbecker | 340/172.5 |
| 3,245,049 | 4/1966 | Sakalay | 340/172.5 |
| 3,331,058 | 7/1967 | Perkins, Jr. | 340/172.5 |
| 3,350,690 | 10/1967 | Rice | 340/172.5 |
| 3,432,812 | 3/1969 | Elfant | 340/172.5 |
| 3,434,116 | 3/1969 | Anacker | 340/172.5 |
| 3,444,526 | 5/1969 | Fletcher | 340/172.5 |
| 3,566,367 | 2/1971 | Gardner et al. | 340/172.5 |

*Primary Examiner*—Paul J. Henon

*Assistant Examiner*—Melvin B. Chapnick

*Attorney*—Spencer and Kaye

[57] ABSTRACT

A data storage system containing an integrated memory for the storage of words of a given number of bits wherein the memory is constructed so that each word address in the memory is provided with a number of memory elements in excess of the given number of bits of the words to be stored and any unusable memory elements in the matrix are modified so that when interrogated they cause a distinctive signal to be produced. In response to these distinctive signals circuitry is provided for directing the data bits into those bit locations or columns of a word address containing only usable memory elements during the writing operation and for compacting or eliminating the gaps between the data bits as the result of unusable memory elements in certain bit locations of a word address during read out. A number of techniques for identifying the unusable memory elements upon interrogation, as well as additional features and schemes for improving the operation of such data systems are also disclosed.

27 Claims, 31 Drawing Figures

PATENTED SEP 19 1972 3,693,159
SHEET 1 OF 6
Fig.1
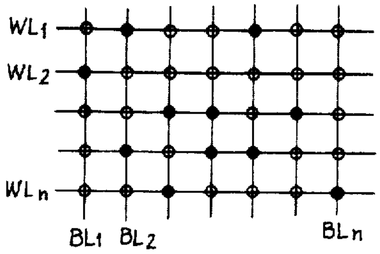
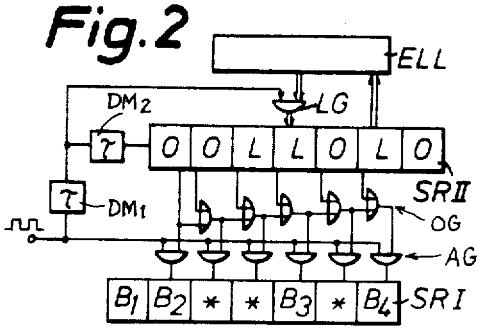
Fig.2
Fig.3
| | | | | | | | |
|---|---|---|---|---|---|---|---|
| SR I | B1 | B2 | * | * | B3 | * | B4 |
| SR II | 0 | 0 | L | L | 0 | L | 0 |
| SR I | B1 | B2 | * | B3 | * | B4 | - |
| SR II | 0 | 0 | L | 0 | L | 0 | - |
| SR I | B1 | B2 | B3 | * | B4 | - | - |
| SR II | 0 | 0 | 0 | L | 0 | - | - |
| SR I | B1 | B2 | B3 | B4 | - | - | - |
| SR II | 0 | 0 | 0 | 0 | - | - | - |
| | w | | | | f | | |
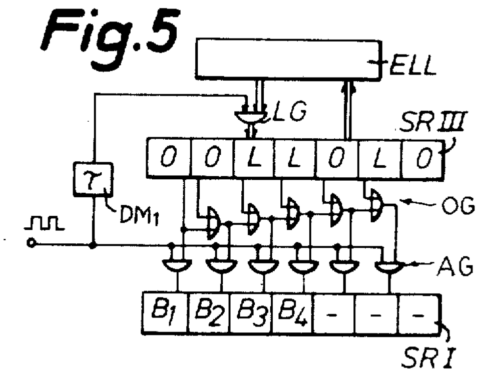
Fig.4a
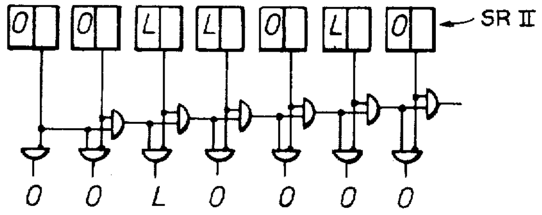
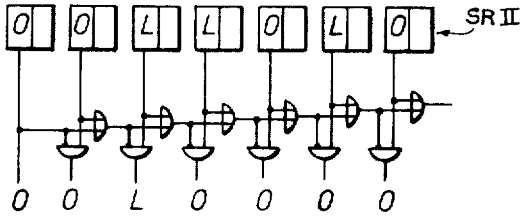
Fig.4b
Fig.6
| | | | | | | | |
|---|---|---|---|---|---|---|---|
| SR I | B1 | B2 | B3 | B4 | - | - | - |
| SR III | 0 | 0 | L | L | 0 | L | 0 |
| SR I | B1 | B2 | * | B3 | B4 | - | - |
| SR III | 0 | 0 | 0 | L | 0 | L | 0 |
| SR I | B1 | B2 | * | * | B3 | B4 | - |
| SR III | 0 | 0 | 0 | 0 | 0 | L | 0 |
| SR I | B1 | B2 | * | * | B3 | * | B4 |
| SR III | 0 | 0 | 0 | 0 | 0 | 0 | 0 |
Inventor:
Wolfgang Hilberg
BY Spencer & Kaye
ATTORNEYS.

Inventor:
Wolfgang Hilberg
BY Spencer & Kaye
ATTORNEYS.

Inventor:
Wolfgang Hilberg

BY Spencer & Kaye
ATTORNEYS.

Inventor:
Wolfgang Hilberg
BY Spencer & Kaye
ATTORNEYS.

Inventor:
Wolfgang Hilberg

BY Spencer & Kaye
ATTORNEYS.

Inventor:
Wolfgang Hilberg
BY Spencer & Kaye
ATTORNEYS.

DATA STORAGE SYSTEM WITH MEANS FOR ELIMINATING DEFECTIVE STORAGE LOCATIONS

BACKGROUND OF THE INVENTION

The present invention relates to a data storage system in which a very large number of identical memory or storage elements is combined into a memory in such a manner that words with a given number of bits are stored, and wherein due to the manufacturing process employed some of these memory elements are unusable.

As is well known the computer art requires very large data stores. For such computers, storage techniques utilizing core memories, thin-film memories and semiconductor memories are of particular interest due to their very short access times.

The necessity in such computers and other types of data processing equipment to accommodate massive volume memories in a small physical area leads to the desire for the so-called integrated memories in which a great many memory elements are produced in a single process at the very locations where they are subsequently to be put to use. In semiconductor memories, the storage or memory elements, which comprise bistable flip-flops, are arranged in a regular checkerboard pattern on the surface of a basic semiconductor wafer. With thin-film memories a thin ferromagnetic layer is produced on which individual bits which form a closed unit are spacially limited with respect to one another and each forms a memory element.

With conventional reading and writing methods for memories a wiring scheme is associated with the memory elements which provides intersecting row and column lines and which is not individually adapted to the particular memory but is rather determined by the dimensions of the memory and is used again and again when a plurality of similar memories are being produced. The repair of individual faulty and thus unusable memory elements within the memory is generally impossible.

Under these circumstances it is therefore necessary to attempt to achieve a substantially reduced fault rate for the individual memory elements as is the case for nonintegrated memories in which the usable memory elements can be selected from among the total number of usable memory elements produced which are then combined into the total memory unit.

Since to date it has been impossible to reduce the fault rate of integrated memories to zero, and since this is not expected to occur in the foreseeable future, consideration has been given to determine how integrated memories exhibiting a relatively small number of useless memory elements can still be put to use. Most proposals in this direction provide for the testing of the memories for faulty memory elements with the aid of a computer which then designs an individual wiring scheme for the memory on the basis of this test so that the useless memory elements are eliminated or perhaps those words (word addresses) which contain the unusable memory elements are eliminated.

While such methods can easily be used in those cases in which the fault rate of the memory elements is relatively low, they are not readily susceptible to use with memories having higher fault rates. For example if it is assumed that 1024 words at 50 bits each are provided in a memory plane, and that 10 percent of all the words contain at least one unusable memory element, the result is that 102 words in the memory must be eliminated. If it is assumed that the errors in the memory plane are statistically distributed, there will be only a few words containing more than one error. The maximum permissible fault rate is consequently approximately $$\frac{102}{1024 \cdot 50} \triangleq 0.2\%$$

Such low fault rates are unrealistic utilizing current manufacturing technology.

Additionally, if one starts with a fault rate of 10 percent per word, it results that an average of 5 memory elements is unusable in each word. With statistical distribution of these elements across the plane, the problems resulting in the provision of individual wiring schemes to eliminate the unusable memory elements are almost insurmountable.

SUMMARY OF THE INVENTION

It is therefore the object of the present invention to provide a data storage system of the above-mentioned type which solves the above-mentioned problems in a simple manner.

These problems are solved according to the present invention in that additional memory elements are provided for each word beyond that corresponding to the given number of bits in each word with the number of these additional memory elements being selected to correspond with the number of unusable memory elements to be expected in a word. The unusable memory elements are changed or modified in such a manner that they cause distinctive signals to be emitted during interrogation which identify the uselessness of the respective memory elements. Circuitry which is responsive to these distinctive signals is provided so that during writing-in of the word those bits which are to be stored by means of an unusable memory element are shifted to the following usable memory element and that during readout the data bits are compressed or shifted to suppress those bit locations corresponding to unusable memory elements within the memory. The spreading out or compressing of the data bits may be done either serially or parallelly.

According to other features of the invention the rate of usability of an entire integrated memory plane may be increased by forming the memory plane so that each word address has two spacially separated physical locations within the memory which are connected in parallel to the word and bit lines i.e., the row and column lines, and/or by providing an auxiliary memory wherein data is stored when an entire word of the memory is unusable.

According to still a further feature of the invention the access or travel time for signals within the system may be reduced by preventing the initiation of the logical process necessary to correct the position of the data bits during write or read operations if none of the above-mentioned distinctive signals are emitted for the particular word of the memory being addressed and/or by by-passing one or more logical elements in the logic circuit by means of an auxiliary loop containing a unidirectional circuit element.

BRIEF DESCRIPTION OF THE DRAWINGS

FIG. 1 shows a word-organized address-controlled memory and its wiring scheme illustrating both usable and unusable memory elements.

FIG. 2 is a schematic logical diagram illustrating a first embodiment for reading out the data from a memory according to the invention.

FIG. 3 is a table illustrating the shifting of the data during readout with the embodiment of FIG. 2 to correct bit position of the data for the presence of bit locations corresponding to unusable memory elements.

FIGS. 4a and 4b are schematic logical diagrams illustrating alternative schemes for a portion of the logic diagram of FIG. 2.

FIG. 5 is a schematic logical diagram illustrating a first embodiment for writing data into a memory according to the invention.

FIG. 6 is a table, similar to FIG. 3, illustrating the shifting of the data to be written into the memory with the embodiment of FIG. 5.

DESCRIPTION OF THE PREFERRED EMBODIMENTS

Figure 7:
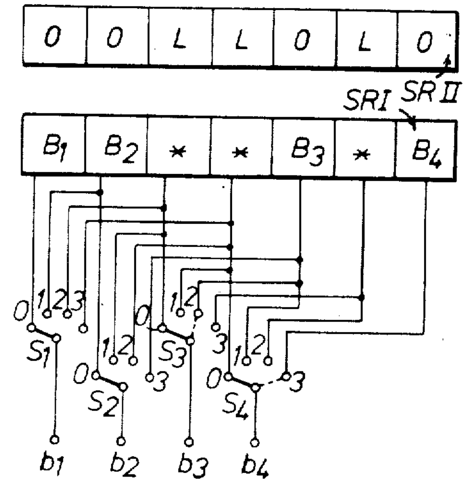
FIG. 7 is a schematic illustration of an alternative embodiment for transferring data to and from a memory according to the invention.

Referring now to FIG. 1, there is schematically shown a word oriented address controlled memory wherein the white circles represent functionable or usable memory elements, while the unusable memory elements are indicated by black circles. Each memory element is controlled via a bit line BL extending in column direction and a word line WL extending in row direction. The fact that some of the memory elements are unusable due to their containing errors as a result of the manufacturing process can be determined by a conventional logic testing program since the wiring scheme is already completely available in the illustrated manner and should not be changed.

For reasons of simplicity in explaining the invention, a semiconductor memory wherein the memory elements are bistable flip-flops will be assumed. It will be understood, however, that as mentioned above, the invention is equally applicable to other forms of integrated memories.

The first operation according to the invention is to change or modify the unusable memory elements in such a manner that they cause signals to be emitted during interrogation ("Readout") which are distinctly different from the O or L signals of the usable memory elements. With a semiconductor memory this can be accomplished, for example, by interruption of one or more of the connections between the output of the memory element and the bit or word lines, e.g. by a conventional photoetching technique or by controlled tightly bundled laser beams. Detailed examples for modifying the memory elements in this manner will be discussed below.

In the case of a thin-film magnetic memory the modification of the individual memory elements may take the form of, for example, destroying the magnetic characteristics by utilizing strong localized heating which can again be provided, for example, by a laser beam. In such a case, no pulse will appear in the readout line during readout instead of a positive or a negative pulse.

If the word or words which are to be stored in the memory are to contain w bits and if, due to the fabrication process, the average number of unusable memory elements is expected to be equal to $f$, the number of memory elements for each word is selected to be $w+f$ when the memory is being produced. Although, in principle, the word can now be completely stored, certain difficulties arise during readout or writing-in of data as a result of the required position displacement to eliminate the unusable memory elements.

Referring now generally to FIG. 2 there is shown an embodiment of a circuit according to the invention utilized for the readout of a memory modified as indicated above, which for reasons of simplicity will be discussed first. As indicated the words stored in the memory contain four bits and each word address in the memory is provided with seven memory elements or bit locations.

Initially, as illustrated, let it be assumed that a word containing faulty or unusable memory elements is addressed in a conventional manner. In general, the signals read from the memory elements representing the word addressed are fed to a memory register SR I, while the signals emitted from the unusable memory elements and which can be identified as such according to the above comments are fed into a memory register SR II. Thus memory register SR I contains the useful information bits $B_1$–$B_4$ as well as effectively empty spaces or locations (*) corresponding to the faulty memory elements, whereas memory register SR II shows an "L" at the locations or stages corresponding to the faulty memory elements. As can easily be appreciated, if memory register SR I is constructed as a shift register, the requisite numbers of shifts can produce the desired arrangement for a stored word in the proper sequence.

For the writing operation, the above-mentioned general readout process is reversed. That is, the desired address is initially called out, and the indication of the bit locations of the faulty memory elements appears in memory register SR II. The word to be stored is fed into memory register SR I and is there properly spread apart so that, corresponding with the contents of memory SR II, none of the information bearing bits is located in stages corresponding to the faulty memory elements. The word is then transferred from memory register SR I into the memory unit in a conventional manner. Instead of using the register SR II for both read and write operations it is also possible to provide an additional memory register SR III in such a manner that one of the memory registers SR II or SR III, respectively, takes over the fault location indication during read and the other during write operations.

Turning now to the specific arrangement of FIG. 2, the readout process will specifically be explained. As indicated, shift register memories SR I and SR II are provided, each of which has the same number of stages as the number of memory elements for each word in the memory. Shift register SR II contains an indication of locations of the faulty memory elements for the word being addressed in the form of an L in its corresponding stage, whereas the locations which are realized by usable memory elements appear as an O. In memory register SR I the locations or stages corresponding to the faulty memory elements are marked with an (*) since it does not matter whether an L or an O signal appears in these locations. Thus memory register SR I contains now, from left to right, bits $B_1$ – $B_4$ which form the word, with each one of these bits $B_i$ being either an O or an L.

Connected between the shift register memories SR I and SR II is a network of AND and OR circuits for the purpose of effecting a shifting of the bits within the memory register SR I toward the left. The output of each stage of the memory register SR II is here connected (except for the first and the last stage) with one input of an associated OR gate OG whose output is connected with the second input of the next-following OR gate, the second input of the first OR gate being connected with the output of the first stage of register SR II. The inputs of the stages of memory register SR I (except for the first stage) are connected with the respective outputs of AND gates AG whose inputs are connected with the outputs of the associated OR gates (or, in the case of the first AND gate, with the output of the first stage of shift register memory SR II). A shift timing signal is fed to each second input of the AND gates AG. This shift timing signal is also applied, via a pair of of delay members, $DM_1$ and $DM_2$ each having a delay time $\tau$ to memory register SR II. An example of the operation of the arrangement shown in FIG. 2, is illustrated in FIG. 3 wherein the contents of memory registers SR I and SR II are shown one above the other at consecutive clock intervals. In this case it again applies that $w = 4$ and $f = 3$, and consequently the registers contain seven stages. In the first clock interval all of the data in memory register SR I which is disposed to the right of the stage corresponding to the first bit location containing a faulty memory element, in the illustrated example, the third bit position, is shifted by one position or stage to the left, and the first L from the left is erased in memory register SR II. As indicated, this process is repeated until the contents of all of the stages of shift memory register SR II are zeros. For the operation of this circuit of FIG. 2 there is also required a logical arrangement ELL which furnishes a criterion for the "first L from the left" and which erases, via an erasing member LG, the respective "first L from the left." Such arrangements are known and simple in construction, see, for example, FIG. 4*a* or FIG. 4*b* which show alternate logical arrangements utilizing two different types of logical connections. After a maximum of f shift pulses the readout information is available in the conventional manner in memory register SR I.

For writing data into the memory the information about the location of the faulty memory elements is again required. This information can be obtained from the distinctive output signals of the faulty memory elements by a repeated readout process or, as shown in FIG. 5, by utilizing a further memory register SR III which contains the same information as memory register SR II in the above-described case. In order to spread out the bits it is only necessary, in the circuit according to that shown in FIG. 5, to shift the data in memory register SR I to the right. The sequence of timed shifts in register SR I of FIG. 5 and the corresponding state of register SR III for a write operation are shown in FIG. 6 in the same manner as shown in FIG. 3 for the readout operation.

The described circuit furnish a serial shift so that a plurality of shift pulses must be utilized which requires additional time, thus lengthening the data transfer cycle. This lengthening is relatively slight because shifts can be accomplished substantially faster than the readout or writing processes. Nevertheless, it would be of advantage to be able to accomplish the described shifts in a single clock pulse. This is possible, according to the above-described apparatus and mode of operation, if each word contains only a maximum of one single faulty memory element. When the above-mentioned values are used as a basis, this leads to a maximum permissible fault rate of $$\frac{1024}{1024 \cdot 50} \triangleq 2\%$$

Though this value is better than the above 0.2 percent it is still difficult to obtain with large capacity memories in today's technology. But it should be mentioned, that without the use of the system according to the present invention, a memory with such a fault rate in which faulty words are eliminated in the previously known manner would already be considered to be unusable.

According to a further advantageous development of the present invention the serial shifting of the data is replaced by a parallel operation. A circuit suitable for this purpose is shown in FIG. 7 wherein there are again provided two memory registers SR I, SR II which contain information about the unusable memory elements or the bit sequence of the memory word, respectively, in the same manner as described above. Each location of the word has an associated selector switch $S_1 - S_4$, which is switchable to a number of positions greater by one than the number of additional memory elements in each word, i.e. $(f + 1)$ or four positions, in the illustrated example. The illustrated switches $S_1 - S_4$ are advisably realized in a known manner with electronic elements. If all switches $S_1 - S_4$ are in a first position O, the individual stages of the memory register SR I are connected in the normal sequence directly with the terminals $b_1 - b_4$ which are associated with switching arms of the selector switches $S_1 - S_4$ and which constitute the input terminals during a write operation and the output terminals during a read operation for register SR I. If one selector switch is in a second position 1, this corresponds to a one-time shift of the respective location toward the right. The same applies for the other switch positions.

However, special signals are required for closing up the informations in memory register SR I during readout which signals depend from the information contained in memory register SR II, and can thus differ along memory register SR I. In the embodiment shown in FIG. 7 it is necessary that the selector switches $S_1 - S_4$ be in positions 0, 0, 2, 3 respectively so that the information contained in memory register SR I is available, with elimination of the faulty memory elements, at the four output terminals $b_1$–$b_4$. It is thus necessary to derive signals for setting selector switches $S_1 - S_4$ from the informations in memory register SR II.

Figure 8:
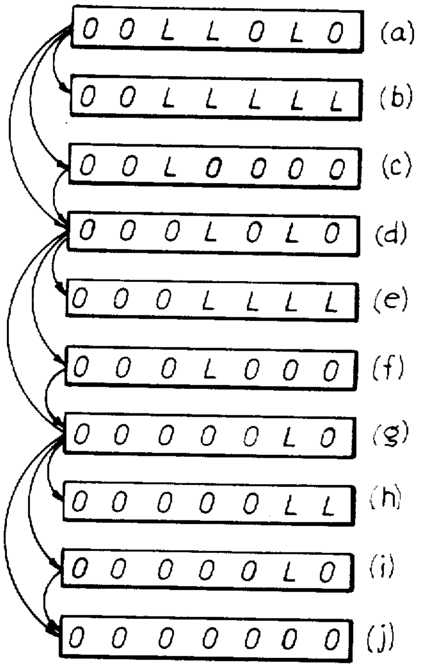
FIG. 8 is a table illustrating the logical sequence of operations necessary to operate the embodiment of FIG. 7.

FIG. 8 shows a scheme illustrating how the contents of memory register SR II can be brought to O in a plurality of consecutive steps so that simultaneously the setting values for selector switches $S_1 - S_4$ are derived. Based on the contents of memory register SR II shown in FIG. 7 a "first shift vector" (FIG. 8*b*) is formed in a first step in such a manner that after the "first L from the left" all locations toward the right are occupied by an L. Thereafter a vector is formed for the "first L from the left" (FIG. 8*c*). This vector is negated and is conjunctively linked with the originally given vector which corresponds to the contents of memory register SR II (FIG. 8*a*). The result of this linkage is a vector (FIG. 8*d*) which corresponds to the original vector except for one location. Only the first L from the left is replaced by an O. This newly formed vector is taken as the starting point in a second step and after the corresponding operations the content of memory register SR II is finally represented with only zeros.

Figure 9A:
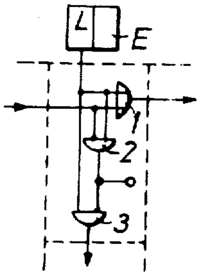
FIGS. 9a -9c are logical circuit diagrams illustrating the manner in which the logical operations of FIG. 8 can be realized.
Figure 9B:
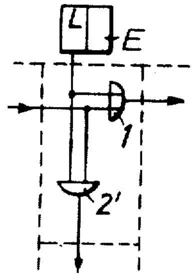

A very advantageous circuit can be found to realize the above-described operations. FIGS. 9*a*, 9*b* show this for a single stage of memory register SR II. An OR gate 1 is connected to the output of the stage according to FIG. 9*a*, the second input of which is connected with the OR gate (not shown) of the preceding stage of the memory register. The "first shift vector" can be taken from the output of this OR gate 1.

The output of the memory stage is further connected with the direct input of an ANDNOT gate 2, whose second input is negated and also linked with the OR gate of the preceding stage, and whose output is connected with a negated input of a further ANDNOT gate 3. The other, i. e. the not negated or direct, input of ANDNOT gate 3 is also connected with the output of the memory stage. At the output of ANDNOT gate 2 the vector "first L from the left" can be obtained. At the output of ANDNOT gate 3 the result of the conjunctive linkage of the negated vector "first L from the left" and the original contents of memory register SR II can be obtained. The output of ANDNOT gate 3 leads directly to the next step according to FIG. 8, which is carried out by repeating the logical circuit 1, 2, 3 with the output of gate 3 corresponding to the output of the memory stage.

According to FIG. 9*b* the same function is accomplished with the use of only a single AND gate 2 with otherwise the same structural components.

Figure 9C:
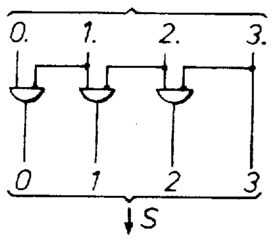

If all the required "shift vectors " have been derived for one location or stage of memory register SR II, the highest "shift vector" must receive priority ahead of all others. This can be accomplished, for example, by means of a circuit as shown in FIG. 9*c* in which the "shift vectors" are fed in from the top and from which a signal corresponding to the necessary switch position is taken off at the bottom. This signal representing the desired switch position is applied to the associated selector switch according to FIG. 7 in any conventional manner to place it in the required position. Each one of these selector switches $S_1 - S_4$ thus receives, at the required switch terminal, a distinct potential which makes possible the immediate switch-through for this register location. FIG. 10*a–d d* show a preferred embodiment of the whole circuitry as it is shown schematically in FIG. 7 and FIGS. 9*b*, 9*c*.

Figure 10A:
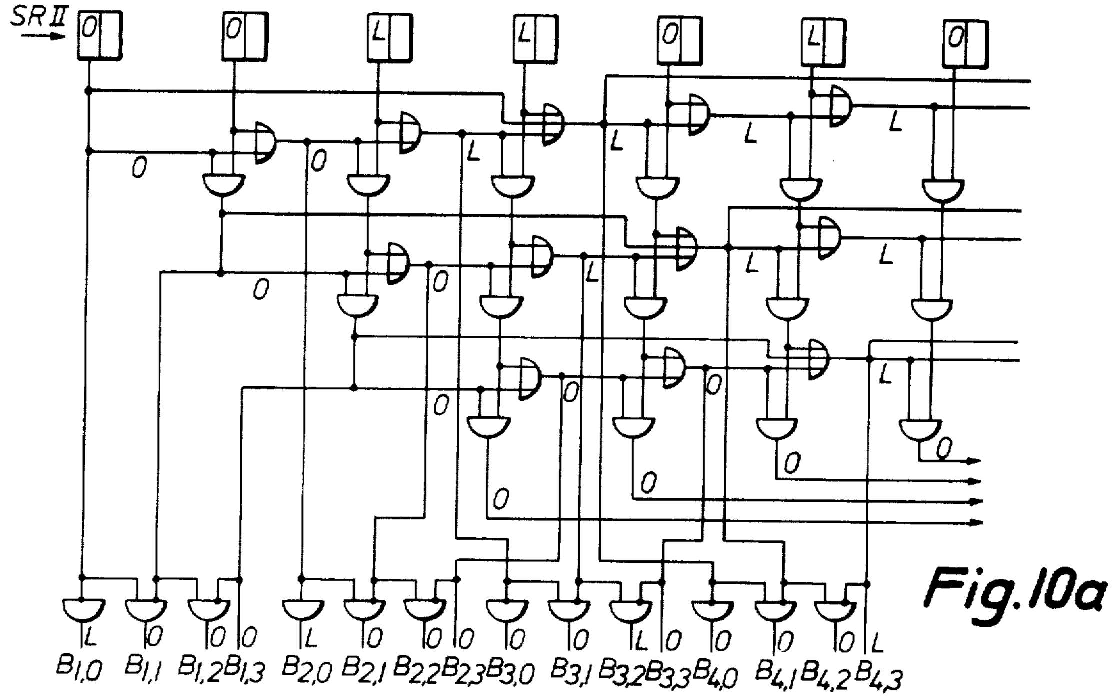
FIGS. 10a -10d are illustrations of two alternative embodiments of the whole circuitry containing the circuits of FIGS. 7, 9b and 9c.

In the memory register SR II of FIG. 10*a* a defective element appears as "L" in the corresponding flip-flop. As it may be seen from the attached network consisting of "And" and "Or"-circuits, signals$B_{\nu,\alpha}$are obtained. The memory register I gives its data into the And-circuits of FIG. 10b, where they are combined with the signals $B_{\nu,\mu}$. Thus the false data are eliminated and the true values ($b_1$, $b_2$, $b_3$, $b_4$) appear in the desired sequence at the output. It can be verified that in this case a reliable read-out is secured for all possible distributions of a maximum of 3 defective elements. Until now it had been assumed that the wanted information in the word was distributed only over the reliable elements and that defective elements were not used to bear any information. This assumption can be fulfilled very easily, if use is made of the single $B_{\nu,\mu}$ derived from the defective elements in the word. The bits of the word to be written must now be spread to the proper places. This can be done e.g. by the same arrangement of logical circuits as in FIG. 10*b* with the direction of them only reversed.

Figure 10B:
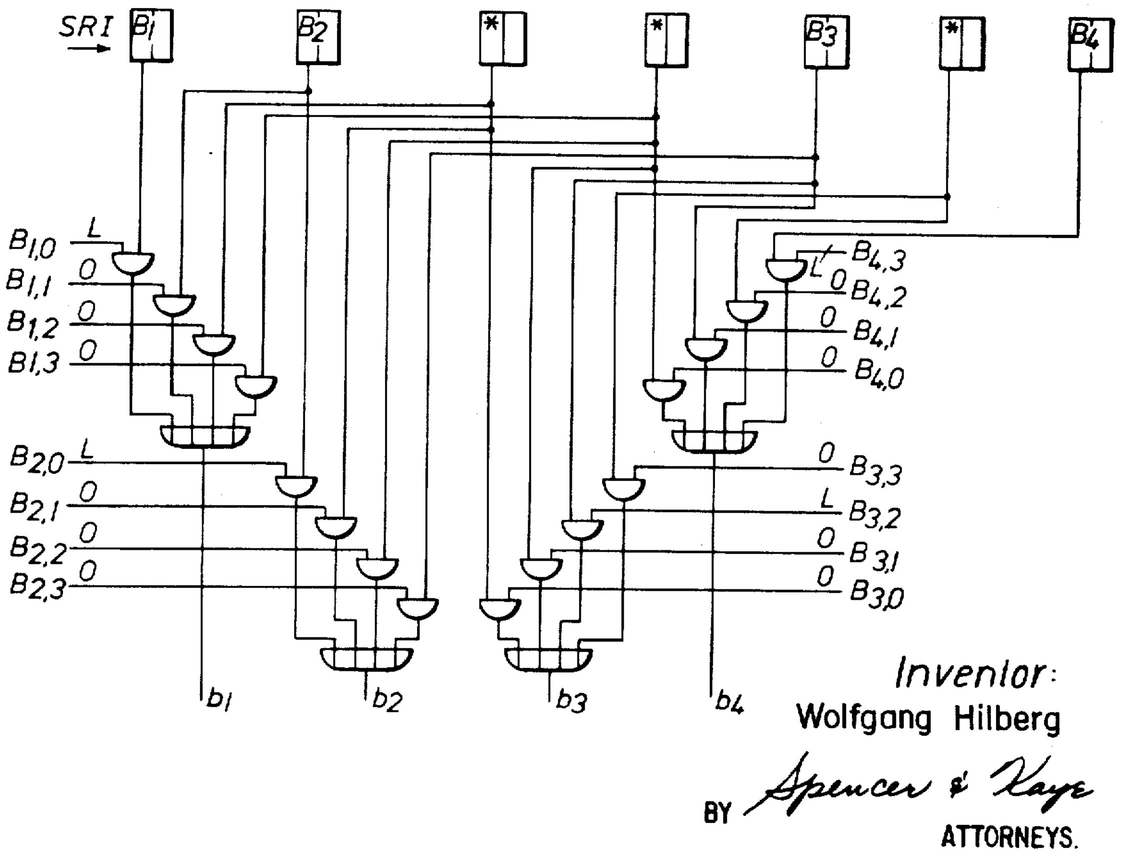
Figure 10C:
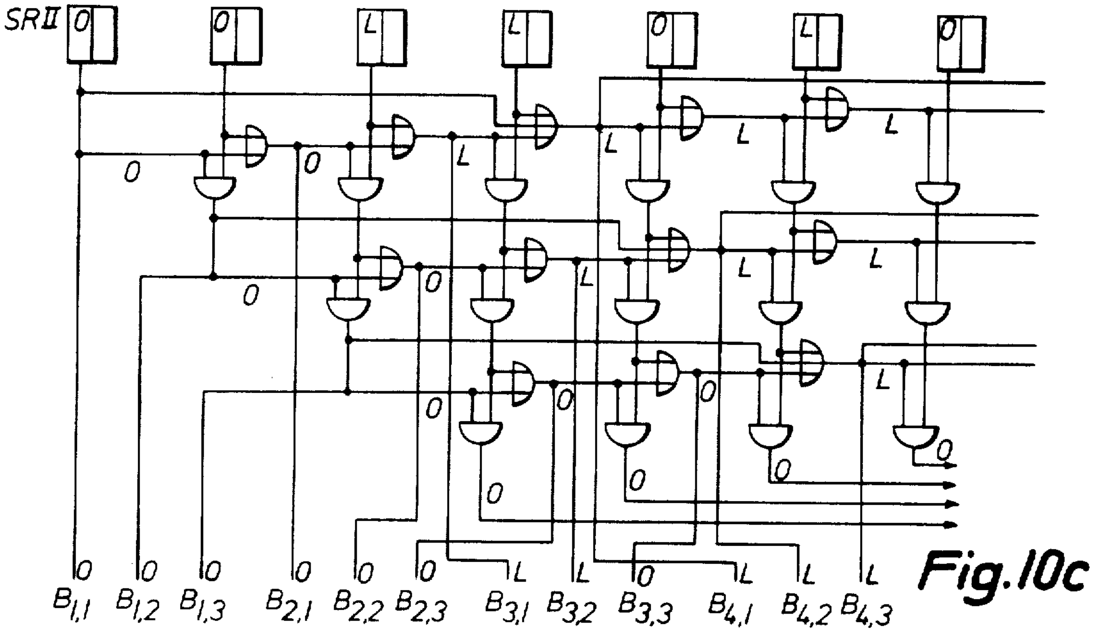
Figure 10D:
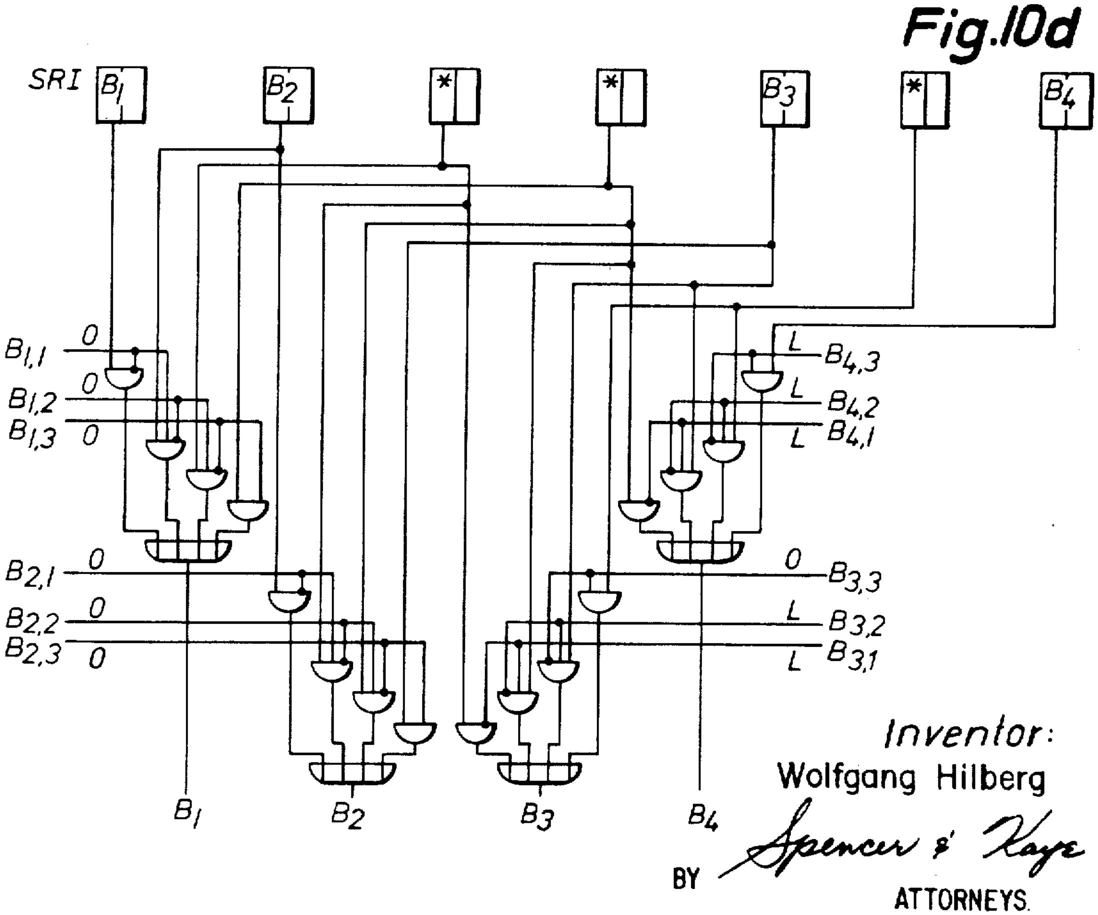

FIGS. 10*c,d* show an equivalent arrangement; the number of components is reduced by combining the functions of the And gates forming the exit of the embodiment of FIG. 10*a* with the functions of the AND gates of FIG. 10*b*, as it easily can be seen.

Thus far a closing up of the information during readout has been described. The same principle however can be correspondingly applied during write-in, where the spreading must, however, occur toward the right instead of toward the left.

Figure 11:
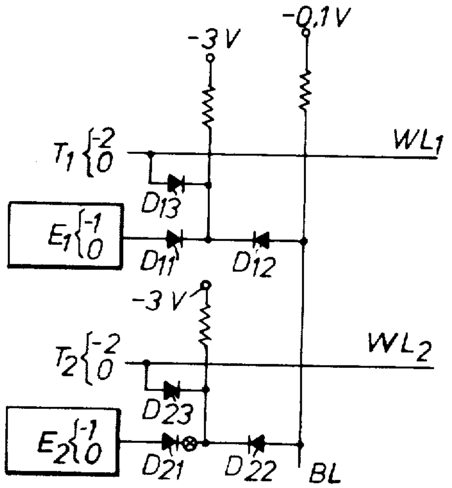
FIGS. 11 and 12 are schematic circuit diagrams illustrating two alternative embodiments of a memory plane with the unusable memory elements modified according to the invention.

Now that the basic manner of dealing with the data during write and read operations in order that it be in the proper form with respect to the usable memory locations and the external circuitry has been described, the manner in which the unusable memory elements can be identified, must be considered. This can be accomplished in a relatively simple manner as shown in FIG. 11 where the memory elements E are realized by bistable flip-flops. In FIG. 11 it is assumed that $E_1$ was determined to be a usable memory element and $E_2$ an unusable memory element. Word lines WL are shown in horizontal direction to which must be applied a clock pulse T for readout of the respective word. Perpendicularly thereto is disposed a bit readout line BL which is connected via a resistor $R_1$ with a voltage source of −0.1 V. Each one of memory elements $E_1$ and $E_2$ is normally connected, via two oppositely connected diodes $D_{11}$, $D_{12}$, or $D_{21}$, $D_{22}$, respectively, with the bit readout line BL. The junction points of diodes $D_{11}$, $D_{12}$ or diodes $D_{21}$, $D_{22}$, respectively, are connected with the associated word readout line WL 1 or WL 2, respectively, via a diode $D_{13}$ or $D_{23}$, respectively, and to a voltage of −3 V via resistors $R_2$ or $R_3$, respectively. Assuming that each memory element E can supply the voltage values −1 or 0 volt depending on its state and that clock pulse T assumes a value of 0 volts for the rest state and −2 volts for readout, a voltage of -0.1 or −1 volts results in the bit readout line BL for the usable element, depending on its stored information, whereas a voltage of −2 volts is supplied for the unusable memory element due to the break in the connection between diode $D_{21}$ and its junction point with diode $D_{22}$. This distinctive voltage can thus serve as the criterion for the unusability of the element. It should be noted that in memories of conventional construction the separation of faulty memory elements from its bit readout line does not lead to the identification of faulty elements by a special voltage. This results from the fact that the outputs of very many memory elements always lead to the bit readout line which normally operate in the manner of an OR circuit. If the not-addressed memory elements supply a 0 potential to the bit readout line, an addressed memory element changes this potential only when it contains an L. A disconnected memory element can thus not be distinguished from a memory element containing a 0. Thus in many cases special circuitry is required to insure that only a distinctive signal representing an addressed faulty memory element determines the potential at the bit readout line as this is shown in the embodiment of FIG. 11.

A further possibility is to represent the O and L signals of addressed usable elements by potentials other than that available in the bit readout line during the rest state. Care must then be taken that addressed faulty memory elements leave the rest potential of the bit readout line unchanged. Since it is known at which time a readout is performed, the continuance of the rest potential would then immediately indicate that a faulty memory element has been addressed.

Figure 12:
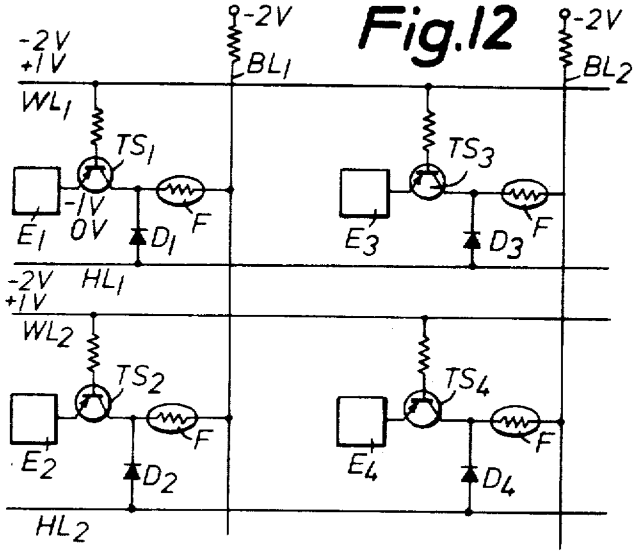

FIG. 12 shows an embodiment for this second scheme for identifying faulty memory elements. There are again shown horizontal word lines $WL_1$ and $WL_2$ and vertical bit readout lines $BL_1$ and $BL_2$, to which is applied at their upper ends through resistors a voltage of −2 volts. The memory elements $E_1$ – $E_4$ in this embodiment supply, when they are usable, the voltage values −1 volts or 0 volts. The outputs of the memory elements $E_1$ – $E_4$ are connected to the emitters of transistors $Ts_1$ – $Ts_4$ respectively and, the bases of the transistors are connected, via resistors, to the associated word lines $WL_1$ or $WL_2$. The collectors of the transistors are connected with the associated bit readout lines $BL_1$ or $BL_2$. The word line WL in its rest state has a potential of +1 volt which keeps the transistors (which are of the pnp type) in a blocked state. For readout, a voltage of −2 volts is applied to the word lines WL which switches the transistors on so that the voltage values −1 volt or 0 volts appear at the bottom of the bit readout lines BL depending on the contents of the interrogated memory element E.

If one of the memory elements E is recognized as being unusable, there again arises the question as to how one of the line connections can best be interrupted to obtain an unequivocal identification of this memory element.

The previously mentioned use of a laser demands an undue amount of time due to the required precision of the aim if a large number of faulty elements are present. The same applies for the photoetching technique which requires the production of individual masks. FIG. 12 illustrates a way in which these difficulties can be overcome. "Melting fuses" F are inserted in the connections between the collectors of the transistors $TS_1$ – $TS_4$ and the associated bit readout lines BL. These fuses may, for example, be particularly narrow conductive paths which can be caused to "-blow" by an increase in current. The current surges can be supplied by means of the bit lines BL and the auxiliary lines $HL_1$ and $HL_2$ which are provided in addition to the word lines and which are connected to the collectors of the transistors $TS_1$ – $TS_4$ via diodes $D_1$ – $D_4$, respectively. After this operation the diodes are permanently blocked by a sufficiently high negative bias applied to the auxiliary lines HL.

If the diodes are also produced in the same integration process, they, of course, may themselves be faulty. It is possible, however, to manufacture these diodes with particular care, for example, by providing them with a particularly large area, but the difficulty principally remains that these diodes must be without flaws, if possible. A way of avoiding these difficulties is to impart the current surges to the fuses F by the application of contact brushes applied to the lead. Another possibility, which is particularly suited when there are a great number of very small memory elements consists in normally providing an interruption in the lines connected to the auxiliary lines HL at the point of diodes D in FIG. 12 during the manufacturing process. After tests have determined the coordinates of the faulty memory elements, the conventional masking technique is employed to complete all of the lines at the locations of the diodes D. Current surges in the respective bit readout lines and auxiliary lines BL or HL, respectively, are then selectively applied to blow the fuses F associated with the coordinates determined to be faulty, and finally, all the lines are again interrupted at the location of diode D by etching in the conventional masking technique. This method has the advantage that it does not require any individual masks.

In addition to the above-mentioned schemes for identifying the unusable memory elements, a particularly simple scheme results when the memory elements are provided with two complementary outputs, as for example bistable flip-flops, and wherein each of the identical outputs of the usable memory elements are connected in groups with a readout line, whereas the unusable memory elements are not connected with a readout line. This further feature will be explained with the aid of FIGS. 13 and 14, showing two advantageous embodiments.

Figure 13:
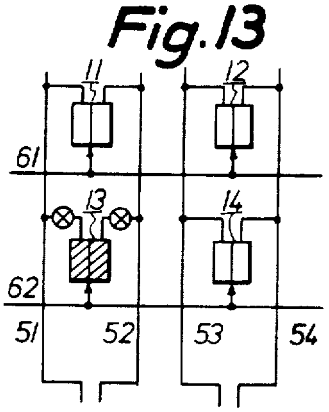
FIGS. 13 and 14 are schematic illustrations of two additional alternative methods of constructing and modifying a memory plane according to the invention when utilizing memory elements having complementary outputs.
Figure 14:
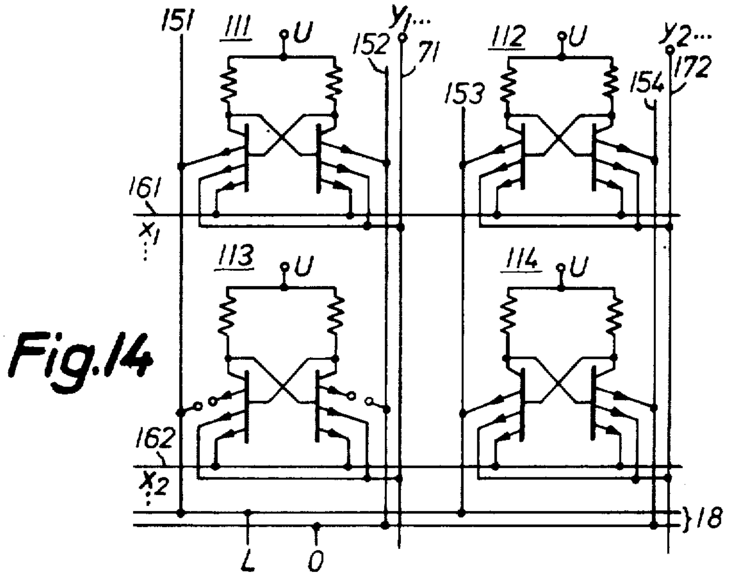
Figure 22:
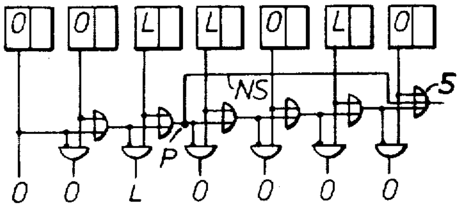
Figure 23:
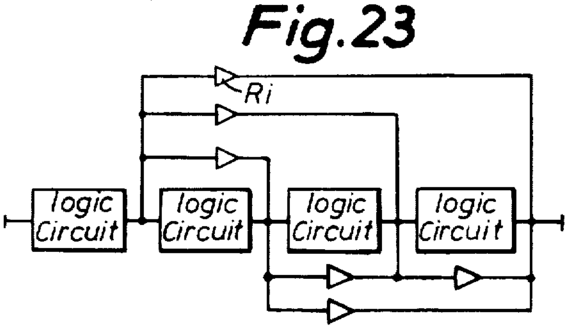

As shown in FIG. 13, the memory includes memory elements 11 – 14, with the memory element 13 being the unusable one. All of the memory elements 11–14 are bistable flip-flops and are provided with two complementary outputs.

The memory elements are addressed in rows via word lines 61 and 62 in the conventional manner. As illustrated the memory elements are connected in columns with readout lines 51, 52, or 53, 54, respectively, in such a manner that each one of these readout lines always connects the same outputs of the memory elements, i. e., either the O or the L output. Memory element 13 indicated as unusable by hatching is, however, not connected with a readout line which is indicated schematically by circles containing an X.

Depending on the stored contents of each memory element, a different potential now appears in the pairs of readout lines 51, 52 or 53, 54, respectively. When the unusable memory 13 is addressed, however, the same potential appears on both readout lines, i. e. the rest potential. In an advantageous further development of the present invention the rest potential is so selected that it coincides with one of the two potentials which each output of a usable memory element is able to put out according on its stored contents. In this special case there are thus only two voltage levels required which simplifies the evaluation circuit.

FIG. 14 shows in greater detail the memory elements in a bit-oriented memory structure, i. e. for the case where the memory elements of each column of FIG. 13 are combined in a plane. The illustrated transistors which each have three emitters are commonly used for bipolar memories. In FIG. 14 four memory elements 111, 112, 113 and 114 are again provided of which memory element 113 is to be considered the unusable one. The readout lines are marked 151, 152, 153 and 154. The lines of interrogation 161 and 162, which in FIG. 13 are present only in rows 61 and 62, are here supplemented by column interrogation lines 71 and 72. The readout lines of each column are combined into a total readout line 18, so that the occurrence of a certain potential in one of the two individual lines of the total line 18 has the logic meaning L, while the occurrence of the same potential in the other one of the individual lines has the logic meaning O.

The use of memory elements having complementary outputs and the thus effected complementarity of the useful signals makes it possible to design the readout lines as symmetrical lines. Symmetrical lines may be simply produced, for example, in printed circuits, so that favorable characteristic impedances result which are well adapted to the impedances of the memory elements. This has the result that no unduly long compensating processes occur during switching. This again permits the readout process to be accomplished speedily.

A further advantageous arrangement according to the invention shown in FIGS. 13 and 14 is that the faulty memory elements are identified by the application of the same potential to both readout lines. This type of identification can be evaluated particularly easily at the output of the readout lines by the provision of digital circuits. This eliminates threshold circuits at these points, and it is not necessary to introduce special interrogation circuits at the location of each memory element.

Figure 15:
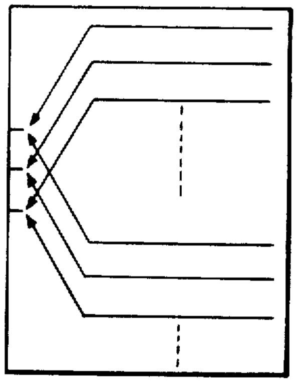
FIG. 15 schematically illustrates a further feature of the invention wherein each word address has two parallelly connected separated locations in the memory plane.

It has been shown in practice, that faults which make memory elements unfit for use often occur in larger numbers at certain points of the memory plane. The reason for this accumulation is to be seen in larger crystal flaws or in reproduction errors along the edges. In such cases it is possible according to another feature of the invention to provide aid in that each bit to be stored has more than one associated memory element. For safety reasons the memory elements associated with one bit will not be disposed closely together, but at different points in the memory plane. FIG. 15 is a schematic representation of the case where two memory elements are provided per bit. The words formed by the bits are always separated by half the memory width and are controlled in parallel. The unusable memory elements are here assumed to be separated from the readout line, which can be accomplished with one of the above-mentioned techniques, whereas the usable memory elements all remain connected. Under these circumstances it is necessary to provide elimination of the faulty bits only in the case where both memory elements associated with one bit are unusable. As an average, compensation for 50 percent of the statistically uniformly distributed errors can be provided with two memory elements per bit. The percentage of cases where both memory elements of a bit are unusable should be relatively low.

According to an advantageous further development of the present invention an auxiliary memory is employed whenever a particular word of the main memory can not be utilized, thus further reducing the number of memory planes, which must be considered unusable.

In the production of integrated circuits care must generally be taken that the number of connections remains as low as possible since the fabrication of a large number of external connections is technically very difficult. It is thus of advantage to form the word selection circuit in the memory plane of a word-organized memory together with the memory elements. If, for example, the word selection circuit of a semiconductor memory constructed of bistable flip-flops is realized on the same base wafer, this word selection circuit may also exhibit flaws which interfere with orderly memory operation, e.g. by providing faulty decoding. This can be eliminated by considering those words which belong to such faulty segments of the word selector circuit to be unusable. The use of an auxiliary store is more favorable, however.

Figure 16:
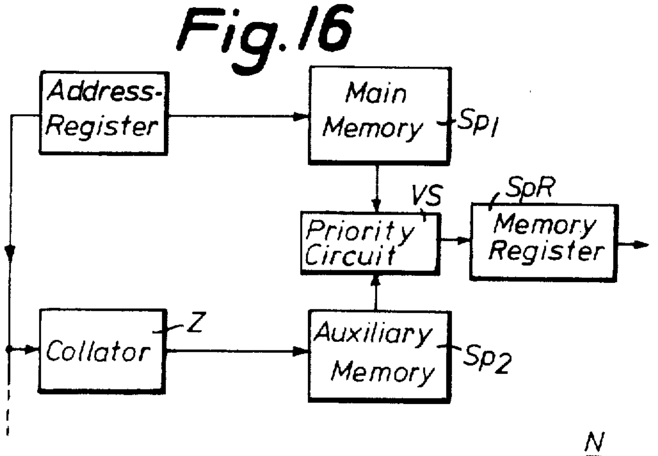
FIG. 16 is a block diagram illustrating a further feature of the invention wherein an auxiliary memory is utilized to store words which can not be stored in a particular address of the main memory.

The use of such an auxiliary store will be briefly sketched below with the aid of FIG. 16. In addition to the memory $Sp_1$ which consists of the above-described memory elements and which is considered to be the main memory, there is also provided a smaller auxiliary memory $Sp_2$.

After fabrication of the memory plane of both memories it is first determined which words can not be set or wrongly set, double for example, due to flaws within the word selector circuit. Furthermore, the above-mentioned test for unusable memory elements within the words is performed. Those words having addresses in the main memory $Sp_1$ which are unusable according to the tests, because they can either be erroneously set or contain more than the permissible number of unusable memory elements, are entered in an auxiliary memory.

Figure 17:
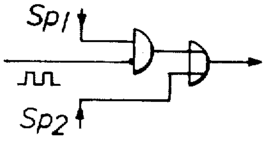
FIG. 17 is a logical circuit diagram of the priority circuit VS of FIG. 16.

In addition to the entry of the unusable addressed words of the main register in the auxiliary register $Sp_2$, the addresses of the faulty words of the main memory $Sp_1$ are associated with the addresses of the usable words words of auxiliary memory $Sp_2$ by means of a fast read only device or an associative memory or a collator (translator) Z. Such devices are known and can be realized in a simple manner, for example as diode matrices. During readout, and only when a unusable word in the main memory $Sp_1$ is addressed, the collator Z will cause the corresponding word in the auxiliary memory $Sp_2$ to be addressed and readout. Since only the memory contents read from auxiliary memory $Sp_2$ can be considered to be correct, its contents are given priority over those being read out from the main memory $Sp_1$ in a priority circuit VS so that the correct memory contents appear in memory register SpR. Such priority circuits can be very easily realized, for example, according to FIG. 17, where an AND gate has its output connected to an OR gate, its inputs connected to the output of the main memory $Sp_1$ and the negated readout instruction for the auxiliary memory $SP_2$. The other input of the OR gate receives the memory contents of auxiliary memory $Sp_2$.

The advantage of the just described further development according to the invention is that in addition to the large main memory it is necessary only to use a substantially smaller auxiliary memory whose size depends on the number of the expected unusable memory elements of the main memory.

From the above discussion it results that the signals must pass through the entire logic circuit chain, e.g. as in FIG. 4*b*. Particularly when the circuit chain becomes very long, time delays result due to the transit times through the individual logical elements. A further advantageous feature of the present invention provides a way for greatly reducing these travel times.

According to this further development at least one auxiliary loop is provided which bridges some of the logical elements and into which a circuit element having a directional effect is incorporated in such a manner that the forward direction of the auxiliary loop coincides with the forward direction of the signal.

Figure 18:
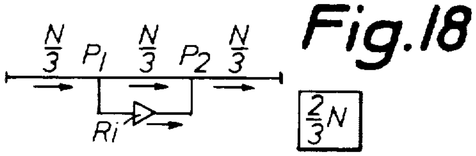
FIGS. 18–21 and 23 are schematic diagrams and FIG. 22 is a logical diagram illustrating a further feature of the invention whereby auxiliary loops which bridge certain logical elements in a logical series train are utilized to reduce the travel time of the data.

This further development will now be explained in detail with the aid of FIGS. 18–23. If the number of logical elements is assumed to be N, the entire circuit chain can be symbolically indicated as having a normal total transit time T (FIG. 18). If this circuit path is divided into three equal sections, two divisional points $P_1$ and $P_2$ result. According to the present invention these two divisional points are now linked together by means of an auxiliary loop having a circuit element (Ri) with a directional effect, i.e., a unidirectional device, incorporated therein. The direction effected by this circuit eelement coincides with the normal direction of the signal flow over the entire path (indicated by arrows). The circuit elements having a directional characteristic may for example be diodes or transistors. Another possibility for realizing this is discussed below. In the scheme according to FIG. 18, since the number of logical elements that have been bypassed is one third, the transit time of the signal, i.e. the time of a level change, from the far left to the far right is only $T_{18} = 2/3\ T$.

Figure 19:
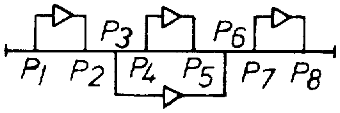
Figure 20:
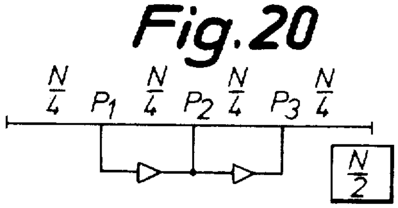

FIG. 19 shows a subdivision of a series logical circuit chain into nine sections, the first divisional point being connected with the second, the third with the sixth, the fourth with the fifth and the seventh with the eighth by means of auxiliary loops according to the invention. The transit time of a signal $T_{19}$ is here $= (2/3)^2\ T$. If for certain reasons, for example economic reasons, the number of circuit elements Ri having a directional effect is significant, in order that the number thereof may be kept low, auxiliary loops may be introduced according to FIGS. 18 and 19, where the following applies $T_{20} = T/2$ or $T_{21} = 2/5\ T$ (the indicies coinciding with the numbers of the associated figures).

It is assumed for these considerations that the circuit elements Ri do not bring about any additional delays. This assumption is correct in a first approximation and may be presupposed particularly when the inputs of already available logical elements are also used as switch elements as in the case, for example, in FIG. 22, which coincides with FIG. 4*b* except for the auxiliary loop NS which leads from a suitably selected divisional point P and is connected with the input of an OR circuit 5 so that the OR circuit brings about the desired directional effect.

Figure 21:
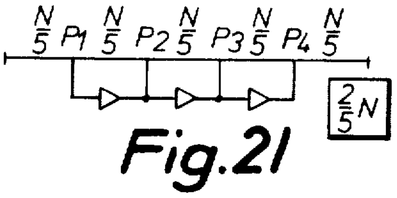

A minimum delay time under the above applicable prerequisites results, according to the present invention, when each output of a member of a chain of logical elements is connected with the input of each of the subsequent logical elements. FIG. 21 schematically shows such arrangement, the boxes being intended to initially represent logical elements. A particularly favorable configuration, however, results when this linkage technique is applied only in individual segments of the chain and the beginning and end points of these segments are then again so connected as if they were only logical circuits. The boxes in FIG. 23 could, thus, also be segments of the chain.

A further shortening of the signal travel times may be accomplished, according to another advantageous feature of the present invention, in that, if no signs of unusable memory elements are present within a word, the process of eliminating errors is not initiated.

Figure 24:
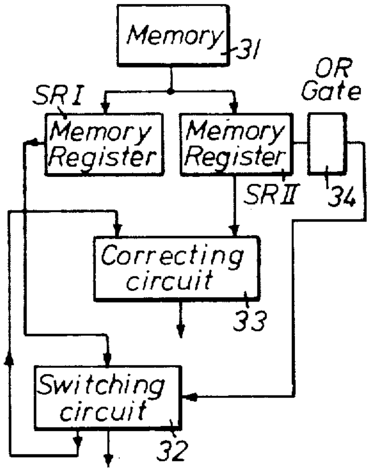
FIG. 24 is a block diagram of a system according to the invention illustrating a further feature of the invention whereby the process of correcting the bit location of data is selectively initiated only when there is an indication that the word address being read from the memory contains an unusable memory element.

This embodiment will now be discussed in detail with the aid of a further drawing (FIG. 24). According to the above, two elements SR I and SR II which represent memory registers are connected to output of the memory 31 exhibiting faulty memory elements. (Memory register SR II is also referred to as SR III in a previous embodiment). As with the previous embodiments the information data contained in the addressed memory word is transferred to memory register SRI and memory register SR II is operated in such a manner that it indicates an L condition in those stages corresponding to unusable memory elements within the memory, and an O condition in each of the other stages. When at least one bit location in memory register SR II has the value L, according to this further feature of the present invention, a switch circuit 32 is operated in such a manner that the correction processes described with respect to FIGS. 1–10 above are initiated by directing the output of register SR I to the data shifting logical arrangement (the devices employed for this purpose are indicated schematically as network 33). If, however, all of the stages of the memory register SR II, or at least the first stages sufficient to store the complete word, have only the condition O, the switch circuit 32 completes a circuit path so that the unchanged contents of memory register SR I may be directly read out, i.e., without being directed to the shifting circuitry 33. The checking of memory register SR II for at least one location with the value L is accomplished in a particularly simple manner by an OR gate 34 associated with memory register SR II. Depending on the output value of this be gate, switch element 32 is put into the one or the other of its two switching positions.

In addition to the previously discussed, address-controlled memories, associative memories have become known. These associative memories are operated practically in the reversed sense as the address-controlled memories. That is a word content is given and the memory is checked to determine whether or not and at which locations this word content is contained in the memory. The given word contents may coincide with the maximum possible word length that can be stored. However, it is also possible that the given word content may be smaller than the maximum possible word length to be stored. The second case is by far the most interesting, because this process does not test for identity but for partial coincidence.

Particularly for operation according to the second type of interrogation it is necessary to operate the associative memory also as an address-controlled memory since after determination of the address at which the given word contents are stored, the entire memory contents belonging to this address are read out.

According to a further advantageous feature of the present invention an integrated data memory constructed as an address controlled memory can be expanded with simple means to serve as an associative memory.

This further development provides that to construct an associative memory the wiring for the associative search process be different for each system and so designed that the unusable memory elements are eliminated.

Figure 25:
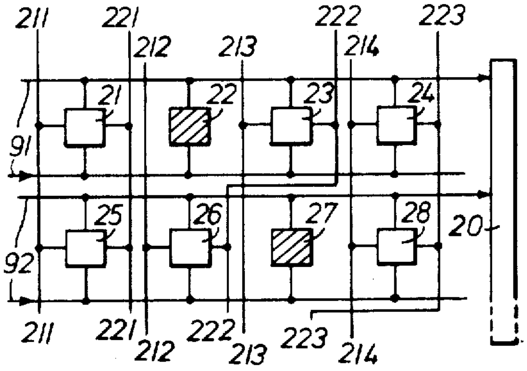
FIG. 25 is a schematic diagram illustrating the modification of an associative memory according to the further feature of the invention.

Referring now to FIG. 25 there is shown a series of memory elements 21 to 28 of which memory elements 22 and 27 are the unusable ones (shown by hatching). Let it be assumed that the memory elements are here bistable flip-flops having complementary construction. However, the present invention can just as well be applied for different types of memories, for example, magnetic thin-film memories. Each memory element is connected in row direction with interrogation lines. These interrogation lines 91 or 92, respectively, each connect as many memory elements as corresponds to the maximum usable length of the word contents to be interrogated. All interrogation lines are connected with a detector matrix 20 which performs the evaluation of the called out addresses in a known manner.

In addition to these word interrogation lines, readout lines 211, 212, 213 and 214 are provided which permit readout of the memory contents and thus do not represent a change compared to the memory structure disclosed in the previous embodiments. However, associative search lines 221, 222, 223 are also provided in columns to permit the associative search process. According to this feature of the present invention these search lines are so designed that they go around the unusable memory elements which, as indicated, are separated from lines 212 to 214. These search lines are advisably constructed in a separate conductive plane. The position of the lines is newly designed for each particular memory since the position of the unusable memory elements changes from memory to memory.

Since in the data storage system according to the present invention the unusable memory elements can be electronically located in a particularly easy manner, the mechanical-electrical testing of separate memory elements for their functionability as it had previously been required for associative memories with flaws is eliminated. This previously required testing process, which is technically extremely difficult due to the minute size of the memory elements in an integrated memory and requires a lot of time for the multitude of memory elements at hand, represents one of the most important cost factors in the manufacture of associative memories having individual wiring. The elimination of these costs when using the present invention thus constitutes its most significant advantage.

A further advantage can be seen in that, contrary to the previously known associative memories, the search lines are separated from the bit readout lines. This separation simplifies the evaluation circuit since it is no longer necessary to separate the readout and search signals arriving on a single line. If, as shown in FIG. 25, the word interrogation lines 91, 92 are provided in duplicate it is even possible to have the search and readout process occur at the same time.

The fact that an additional conductive plane is provided permits a particularly simple identification of the unusable memory elements. This identification serves to cause the unusable memory elements to emit, during interrogation, signals of an entirely different type than the usable memory elements. This can be accomplished, as discussed, by the appropriate separation; it is however also possible to achieve the same effect by the incorporation of short-circuit bridges. These short-circuit bridges connect, for example, the collectors of the transistors of memory elements which are designed as bistable flip-flops. These short-circuit bridges may now be contained in the conductive plane containing the search lines so that the unusable memory elements are eliminated simultaneously with the application of the additional wiring without requiring a separate process step for this purpose.

It will be understood that the above description of the present invention is susceptible to various modifications, changes and adaptations, and the same are intended to be comprehended within the meaning and range of equivalents of the appended claims.

I claim:

1. In a data storage system in which a very large number of identical memory elements are combined into an integrated memory matrix in such a manner that words of a given number of bits are stored, and wherein, due to the manufacturing process employed, a portion of the memory elements in said memory matrix are normally unusable, the improvement comprising: additional memory elements in excess of the given number of bits being provided in said memory matrix for each word, with the number of said additional memory elements being selected to correspond with the number of unusable memory elements to be expected for said word as a result of the manufacturing process, each of said unusable memory elements being modified in such a manner that it causes a distinctive signal to be emitted when it is interrogated, which identifies the unusability thereof; means for interrogating all the said memory elements of a word; and means responsive to said distinctive signals emitted during interrogation and operative during the writing in said memory matrix of a word, for shifting those bits of the word which are to be stored in a bit location containing an unusable memory element and each of the succeeding bits of the word to the next-following bit locations of the word containing usable memory elements whereby the bits of the word are stored in said memory matrix in their proper sequence.

2. A data storage system as defined in claim 1 wherein said means responsive to the signal emitted during interrogation include means operative during the reading out of words from said memory matrix for shifting the data bits of the word read from said memory matrix to suppress those bit locations which belong to unusable memory elements.

3. A data storage system as defined in claim 2 wherein at least one auxiliary loop is provided for a series logic circuit train of said system to reduce the travel time of the data therethrough, said auxiliary loop bridges at least some of the logic circuit members and containing a circuit element having a unidirectional signal transmitting direction, said circuit element being in said loop in such a manner that the forward direction of the auxiliary loop coincides with the forward direction of the signal.

4. A data storage system as defined in claim 3 wherein said circuit element is a diode or a transistor.

5. A data storage system as defined in claim 3 wherein said circuit element comprises an already available logic circuit which is further utilized as a portion of said auxiliary loop.

6. A data storage system as defined in claim 3 wherein the output of each of the logic circuit members in said series chain is connected, by means of auxiliary loops, with the inputs of each subsequent logic circuit member in the forward direction, via one of said circuit elements.

7. A data storage system as defined in claim 3 wherein the output of each of the logic circuit members in consecutive segments of said chain of logic circuit members is connected through auxiliary loops with the inputs of each subsequent logic circuit member of the same segment in the forward direction via a said circuit element, and wherein an appropriate connection technique is employed with reference to the beginning and end points of the individual segments.

8. In a data storage system in which a very large number of identical memory elements are combined into an integrated memory matrix in such a manner that words of a given number of bits are stored, and wherein, due to the manufacturing process employed, a portion of the memory elements in said memory matrix are normally unusable, the improvement comprising: additional memory elements in excess of the given number of bits being provided in said memory matrix for each word, with the number of said additional memory elements being selected to correspond with the number of unusable memory elements to be expected for said word as a result of the manufacturing process, each of said unusable memory elements being modified in such a manner that it causes a distinctive signal to be emitted when it is interrogated, which identifies the unusability thereof; means for interrogating all the said memory elements of a word; and means responsive to said distinctive signals emitted during interrogation and (a) operative during the writing of a word into said memory matrix for shifting those bits of the word which are to be stored in a bit location containing an unusable memory element to the next-following bit location of the word containing usable memory element and (b) further operative during the reading out of words from said memory matrix for shifting the data bits of the word read from said memory matrix to suppress those bit locations which belong to unusable memory elements, said means responsive to said distinctive signals including: at least a first shift register having a number of binary stages equal to the number of the given bits plus the number of the additional memory elements provided for each word, said first shift register being responsive to said distinctive signals so that those stages corresponding to the bit locations of the unusable memory elements are in a first binary condition and the remaining stages are in the opposite binary condition; a further shift register having the same number of binary stages as said first shift register, said further shift register being coupled to said memory and containing the word to be written in or read out from said memory; and logic circuit means interconnecting said first and further shift registers and responsive to the condition of the stages of said first shift register for shifting the data bits within said further shift register in a timed pattern in a first direction during the write-in operation until the data bits are located in the respective stages of said further shift register corresponding to bit locations having only usable memory elements, and in the opposite direction during the readout operation until all of the data bits are in adjacent stages of said further shift register, said logic circuit means being responsive to the condition of the first stage of said first shift register which is in said first condition to shift only the data bits in the subsequent corresponding stages of said further shift register.

9. A data storage system as defined in claim 8 including means responsive to the signals emitted by the memory elements of a word during interrogation for preventing the initiation of the sequence of logical operations performed by said means for shifting the data bits when said distinctive signals indicate that unusable memory elements are not contained within the word being read, whereby the travel time of the data during readout is reduced.

10. A data storage system as defined in claim 9 wherein said means for preventing the said logical sequence of operations comprises an interrogation circuit means connected to the stages of said first shift register for producing an output signal whenever at least one stage of said first shift register is in said first condition, the absence of said output signal from said interrogation circuit means initiating the evaluation of the unchanged contents of said further shift register.

11. A data storage system as defined in claim 10 wherein said interrogation circuit means is an OR circuit.

12. In a data storage system in which a very large number of identical memory elements are combined into an integrated memory matrix in such a manner that words of a given number of bits are stored, and wherein, due to the manufacturing process employed, a portion of the memory elements in said memory matrix are normally unusable, the improvement comprising: additional memory elements in excess of the given number of bits being provided in said memory matrix for each word, with the number of said additional memory elements being selected to correspond with the number of unusable memory elements to be expected for said word as a result of the manufacturing process, each of said unusable memory elements being modified in such a manner that it causes a distinctive signal to be emitted when it is interrogated, which identifies the unusability thereof; means for interrogating all the said memory elements of a word; and means responsive to said distinctive signals emitted during interrogation and (a) operative during the writing of a word into said memory matrix for shifting those bits of the word which are to be stored in a bit location containing an unusable memory element to the next-following bit location of the word containing usable memory element, and (b) further operative during the reading out of words from said memory matrix for shifting the data bits of the word read from said memory matrix to suppress those bit locations which belong to unusable memory elements, said means responsive to said distinctive signals including: at least a first shift register having a number of binary stages equal to the number of the given bits plus the number of additional memory elements provided for each word, said first shift register being responsive to said distinctive signals so that those stages corresponding to the bit locations of unusable memory elements are in a first binary condition and the remaining stages are in the opposite binary condition; a further shift register having the same number of stages as said first shift register, said further shift register being coupled to said memory and containing the word to be written in or read out from said memory; means for parallelly writing in or reading out the bits of a data word from said further shift register including a plurality of selector switch means equal in number to the number of bits in the word, with each of said selector switch means having a number of switching positions which is greater by one than the number of said additional memory elements, each of said switch means being coupled to the stages of said further shift register to switch through, depending on its switching position, the directly associated stage of said further shift register or the next-higher locations thereof, and means responsive to the contents of said first shift register for determining the switching position of said selector switch means so that the bit locations in said memory containing unusable memory elements are eliminated.

13. A data storage system as defined in claim 12 wherein said means for determining the switching position of each of said selector switch means comprises a logic network means which is associated with said first shift register for emitting a "first shift order" by first switching all of the stages of said first shift register after the first stage which is in said first binary condition to said first binary condition and then switching said first stage of said first shift register which is in said first binary condition to the opposite binary condition; said logic network correspondingly utilizing the thus changed information to derive further "shift orders" until the maximum permissible number of error data contained in the stages in said first condition has been switched to the opposite binary condition.

14. In a data storage system in which a very large number of identical bistable flipflop memory elements are combined into an integrated memory matrix in such a manner that words of a given number of bits are stored, and wherein, due to the manufacturing process employed, a portion of the memory elements in said memory matrix are normally unusable, the improvement comprising: additional bistable flipflop memory elements in excess of the given number of bits being provided in said memory matrix for each word, with the number of said additional memory elements being selected to correspond with the number of unusable memory elements to be expected for said word as a result of the manufacturing process, each of said unusable memory elements being disconnected from at least one of the word and bit lines associated with the unusable memory element in such a manner that during readout a distinctive output signal results at the unusable memory element which differs in its amplitude from the output signals of the usable memory elements and thus identifies the unusability thereof; means for interrogating all the said memory elements of a word; and means responsive to said distinctive signals emitted during readout and operative during the writing of a word into said memory matrix, for shifting those bits of the word which are to be stored in a bit location containing an unusable memory element to the next-following bit location of the word containing a usable memory element.

15. A data storage system as defined in claim 14 wherein, all of said bistable flipflops are connected to at least one of the word and bit lines of said memory via a fuse element, and wherein the fuse elements of the unusable memory elements are burned out, thereby separating the unusable memory element from the associated line, by passing a current of sufficient magnitude through said associated line.

16. A data storage system as defined in claim 15 wherein each of said memory elements is provided with a diode connected in series with said fuse element, the associated bit or word line and an auxiliary line through which current is fed via said diodes to burn out the fuse elements of the unusable memory elements, and means for applying a voltage to said auxiliary lines to maintain the said diodes of the usable memory elements in a blocked condition.

17. A data storage system as defined in claim 14, wherein the identification of the unusable memory elements is accomplished by providing the said means for interrogating the memory elements with means for producing a special potential, which differs from the potentials emitted by a usable memory element in its two possible memory states, when the unusable memory element is interrogated via the bit readout line.

18. A data storage system as defined in claim 17 wherein said special potential differs from the potential present on the bit lines in the rest state.

19. A data storage system as defined in claim 17 wherein said special potential coincides with the potential on said bit lines in the rest state, and wherein said means for interrogating said memory elements causes the potentials produced on the bit line by a usable memory element in either of its two possible storage states when being interrogated to be different from the potential present on the bit line when the memory is in the rest state.

20. A data storage system as defined in claim 14 wherein the two complementary outputs of said flip-flops are connected to bit lines with the identical outputs of all of the usable memory elements in any bit location being connected in groups with a single readout line, and wherein outputs of the unusable memory elements are not connected with a readout line.

21. A data storage system as defined in claim 20 wherein one of the two signals which can be emitted by each output of a usable memory element coincides with the rest potential in the readout line.

22. In a data storage system in which a very large number of identical thin film ferromagnetic memory elements are combined into an integrated memory matrix in such a manner that words of a given number of bits are stored, and wherein, due to the manufacturing process employed, a portion of the memory elements in said memory matrix are normally unusable, the improvement comprising: additional thin film ferromagnetic memory elements in excess of the given number of bits being provided in said memory matrix for each word, with the number of said additional memory elements being selected to correspond with the number of unusable memory elements to be expected for said word as a result of the manufacturing process, each of said unusable elements being modified by the destruction of its magnetic characteristic by the application of strong heat, preferably with the aid of laser beams, so that it causes a distinctive signal to be emitted when it is interrogated, which identifies the unusability thereof; means for interrogating all the said memory elements of a word; and means responsive to said distinctive signals emitted during interrogation and (a) operative during the writing of a word into said memory matrix for shifting those bits of the word which are to be stored in a bit location containing an unusable memory element to the next-following bit location of the word containing a usable memory element, and (b) further operative during the reading out of words from said memory matrix for shifting the data bits of the word read from said memory matrix to suppress those bit locations which belong to unusable memory elements.

23. In a data storage system in which a very large number of identical memory elements are combined into an integrated memory matrix in such a manner that words of a given number of bits are stored, and wherein, due to the manufacturing process employed, a portion of the memory elements in said memory matrix are normally unusable, the improvement comprising: said memory matrix being constructed such that each word has two associated spatially separated addresses within the memory which are connected in parallel; additional memory elements in excess of the given number of bits being provided in said memory matrix for each word, with the number of said additional memory elements being selected to correspond with the number of unusable memory elements to be expected for said word as a result of the manufacturing process, each of said unusable memory elements being modified in such a manner that it causes a distinctive signal to be emitted when it is interrogated, which identifies the unusability thereof; means for interrogating all the said memory elements of a word; and means responsive to said distinctive signals emitted during interrogation and (a) operative during the writing of a word into said memory matrix for shifting those bits of the word which are to be stored in a bit location containing an unusable memory element to the next-following bit location of the word containing a usable memory element, and (b) further operative during the reading out of words from said memory matrix for shifting the data bits of the word read from said memory matrix to suppress those bit locations which belong to unusable memory elements.

24. In a data storage system in which a very large number of identical memory elements are combined into an integrated memory matrix in such a manner that words of a given number of bits are stored, said memory matrix being the main memory of said data storage system and wherein, due to the manufacturing process employed, a portion of the memory elements in said memory matrix are normally unusable, the improvement comprising: additional memory elements in excess of the given number of bits being provided in said memory matrix for each word, with the number of said additional memory elements being selected to correspond with the number of unusable memory elements to be expected for said word as a result of the manufacturing process, each of said unusable memory elements being modified in such a manner that it causes a distinctive signal to be emitted when it is interrogated, which identifies the unusability thereof; means for interrogating all the said memory elements of a word; means responsive to said distinctive signals emitted during interrogation and (a) operative during the writing of a word into said memory matrix for shifting those bits of the word which are to be stored in a bit location containing an unusable memory element to the next-following bit location of the word containing a usable memory element and (b) further operative during the reading out of words from said memory matrix for shifting the data bits of the word read from said memory matrix to suppress those bit locations which belong to unusable memory elements a separate auxiliary memory for storing those data words which can not be written into a particular word address in said main memory; circuit means interconnecting said main and auxiliary memories for simultaneously reading out the associated information from said auxiliary memory when said particular word address in said main memory is addressed; and priority circuit means connected to the outputs of said main and auxiliary memories for passing only the output signals from said auxiliary memory whenever output signals simultaneously appear at the output signals of both said main and auxiliary memories.

25. In a data storage system in which a very large number of identical memory elements are combined into an integrated memory matrix in such a manner that words of a given number of bits are stored, and wherein, due to the manufacturing process employed, a portion of the memory elements in said memory matrix are normally unusable, the improvement comprising: additional memory elements in excess of the given number of bits being provided in said memory matrix for each word, with the number of said additional memory elements being selected to correspond with the number of unusable memory elements to be expected for said word as a result of the manufacturing process, each of said unusable memory elements being modified in such a manner that it causes a distinctive signal to be emitted when it is interrogated, which identifies the unusability thereof; means for interrogating all the said memory elements of a word; means responsive to said distinctive signals emitted during interrogation and (a) operative during the writing of a word into said memory matrix for shifting those bits of the word which are to be stored in a bit location containing an unusable memory element to the next-following bit location of the word containing a usable memory element, and (b) further operative during the reading out of words from said memory matrix for shifting the data bits of the word read from said memory matrix to suppress those bit locations which belong to unusable memory elements; said memory matrix being additionally used as an associative memory, and wherein for its use as an associative memory, additional wiring for the associative searching process is provided for said memory elements, said additional wiring being different for each particular system and is such that the unusable memory elements are bypassed and each bit or read line is connected to the same number of usable memory elements in said memory matrix.

26. A data storage system as defined in claim 25 wherein said additional wiring is in the form of an additional conductive plane produced by vapor deposition on said memory matrix.

27. A data storage system as defined in claim 26 wherein said additional conductive plane is additionally provided with connecting lines which short-circuit portions of said unusable memory elements so that they can now be identified upon interrogation.

* * * * *

UNITED STATES PATENT OFFICE
CERTIFICATE OF CORRECTION

Patent No. 3,693,159 Dated September 19th, 1972

Inventor(s) Wolfgang Hilberg

It is certified that error appears in the above-identified patent and that said Letters Patent are hereby corrected as shown below:

In the heading of the patent, after line 11, insert --Dec. 20, 1969 Germany.............P 19 63 895.0--.
Column 8, line 33, change "10a - d d" to --10a - d--; line 39, change "$B_{\nu,\alpha}$" to --$B_{\nu,\mu}$--. Column 14, line 27, change "in" to --is--.
Column 15, line 17, change "be" to --OR--.

Signed and sealed this 10th day of April 1973.

(SEAL)
Attest:

EDWARD M.FLETCHER,JR.
Attesting Officer

ROBERT GOTTSCHALK
Commissioner of Patents